R. WASHBURN.
EGG BEATER.
APPLICATION FILED APR. 6, 1908.

1,134,170.

Patented Apr. 6, 1915.

Witnesses
Roy D. Tolman
Penelope Comberbach

Inventor
Reginald Washburn
By Rufus B Fowler
Attorney

UNITED STATES PATENT OFFICE.

REGINALD WASHBURN, OF WORCESTER, MASSACHUSETTS, ASSIGNOR TO THE WIRE GOODS COMPANY, OF WORCESTER, MASSACHUSETTS, A CORPORATION OF MASSACHUSETTS.

EGG-BEATER.

1,134,170. Specification of Letters Patent. Patented Apr. 6, 1915.

Application filed April 6, 1908. Serial No. 425,549.

*To all whom it may concern:*

Be it known that I, REGINALD WASHBURN, a citizen of the United States, residing at Worcester, in the county of Worcester and Commonwealth of Massachusetts, have invented certain new and useful Improvements in Egg-Beaters, of which the following is a specification, accompanied by drawings forming a part of the same, in which—

Figure 1:
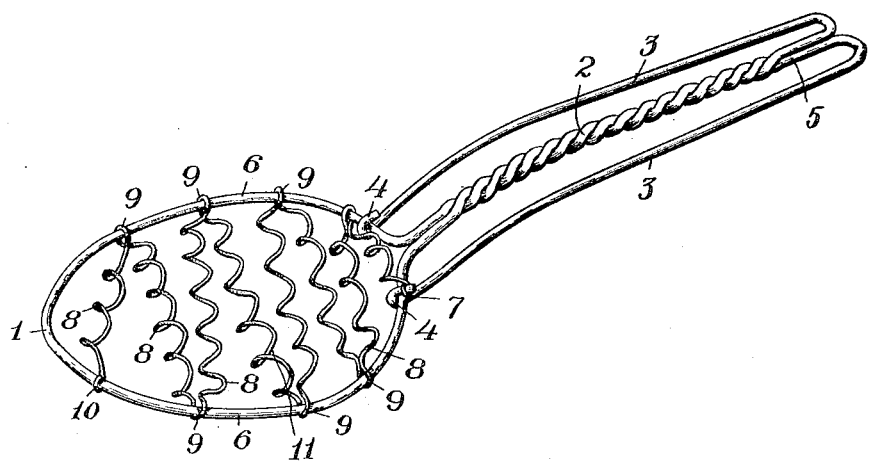
Figure 2:
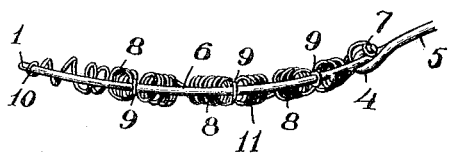

Figure 1 is a perspective view of my improved egg beater, and Fig. 2 is a side view of the egg beater without the handle.

Similar reference figures refer to similar parts in the different views.

My invention relates to that class of utensils designed to assist the operator in the manual agitation of certain materials, for the breaking down of the individual particles and for the introduction of air therein, and it consists in the construction and arrangement of parts as hereinafter described and pointed out in the annexed claim.

Referring to the accompanying drawings 1 is the beater frame formed, in the present instance, of a single wire bent in elliptical shape with the wire twisted at 2, returned parallel to the twisted portion at 3, 3, and with the ends of the wire attached to the frame at 4, 4. The twisted portion 2 and the parallel returning wires 3, 3, form the handle 5 of the beater, which may be constructed in any convenient shape and forms no part of my present invention.

The sides 6, 6, of the frame 1, in ordinary beaters of this class, are connected by single strands of wire, usually of smaller diameter than the wire of the frame and interlaced or crossed in any convenient arrangement. In the use of the beater the handle 5 is grasped by the operator, the frame with its interlaced wires is inserted in the liquid material destined to be agitated, and the beater is given a rapid to and fro or circular movement, in which the wires operate to break down the particles of the material, and carry, at the same time, a certain amount of air throughout it. The interlaced wires of the ordinary beater lie throughout in the plane of the frame 1, and, therefore, each interlacing wire, in a single movement of the beater, makes but a single path of cleavage through the material for the entrance of air.

In my improved beater I connect the sides 6, 6, of the frame 1 with a single wire arranged, however, in short transverse bends between its connections with the sides 6, 6. This single wire has one end attached to the frame at 7 and is bent in loose irregular spirals 8, extending back and forth between the sides 6, 6, in convenient lengths, held in position by loops around the sides 6, 6, as at 9, the other end of the wire being attached to the frame at 10.

Other forms of connection between the sides 6, 6, may be employed to form the agitating portion 11 of the beater without departing from the spirit of my invention, which is substantially to arrange the agitating portion 11 so that a part of the wires of the agitating portion shall lie in planes transverse to the plane of the frame 1. By this arrangement, in a single movement of the beater, a number of intersecting and diverse paths or openings are cut through the material beaten by each wire connection between the sides 6, 6, thereby greatly increasing the efficiency of the beater both for breaking up the material and for introducing air throughout it. The number of the strokes required to thoroughly agitate the material is greatly lessened, and the thoroughness of the agitation is rendered much more complete.

I am aware that beaters have been constructed which include coiled wires with the axes of the coils lying in the plane of the frame of the beater. In my beater, however, the various coils are all formed from a single wire looped about the edges of the frame. This construction renders the beater more substantial by reducing the number of parts or members which it is necessary to join together in constructing the beater. The described construction also causes the sections of the coiled wire to travel in directions nearly, but not quite, parallel with the axes thereof so that the maximum beating effect is obtained.

I claim,

A beater of the class described, comprising a frame formed from a single stiff wire bent at its central portion into a closed loop and with its ends extended at one end of the loop to form a handle, and a second single wire crossing and recrossing said loop and extending around and secured to its sides, the sections of said second wire being coiled into helical form and adjacent sections having their axes at an acute angle with each other.

Dated this second day of April 1908.

REGINALD WASHBURN.

Witnesses:
 HENRY WOOD FOWLER,
 PENELOPE COMBERBACH.